United States Patent
Noirot et al.

(10) Patent No.: US 10,649,406 B2
(45) Date of Patent: May 12, 2020

(54) PROCESS FOR DECORATING A TIMEPIECE COMPONENT AND TIMEPIECE COMPONENT OBTAINED BY SUCH A PROCESS

(71) Applicant: ROLEX SA, Geneva (CH)

(72) Inventors: Antony Noirot, Saint-Pierre en Faucigny (FR); Alexandre Oliveira, Amancy (FR)

(73) Assignee: ROLEX SA, Geneva (CH)

( * ) Notice: Subject to any disclaimer, the term of this patent is extended or adjusted under 35 U.S.C. 154(b) by 908 days.

(21) Appl. No.: 15/068,224

(22) Filed: Mar. 11, 2016

(65) Prior Publication Data

US 2016/0263698 A1 Sep. 15, 2016

(30) Foreign Application Priority Data

Mar. 13, 2015 (EP) .................... 15158933

(51) Int. Cl.
| | |
|---|---|
| G04B 19/12 | (2006.01) |
| G04B 29/02 | (2006.01) |
| B23K 26/352 | (2014.01) |
| B44C 1/22 | (2006.01) |
| B23K 26/00 | (2014.01) |

(Continued)

(52) U.S. Cl.
CPC ............ *G04B 19/12* (2013.01); *B23K 26/355* (2018.08); *B44C 1/228* (2013.01); *G04B 29/027* (2013.01); *B23K 26/0006* (2013.01); *B23K 26/0624* (2015.10); *B23K 2103/04* (2018.08); *B23K 2103/08* (2018.08); *B23K 2103/12* (2018.08); *B23K 2103/14* (2018.08); *B23K 2103/52* (2018.08)

(58) Field of Classification Search
CPC ...... B23K 26/355; B23K 26/259; G44C 1/22; G44C 1/225; G44C 1/228
See application file for complete search history.

(56) References Cited

U.S. PATENT DOCUMENTS 4,725,511 A * 2/1988 Reber .................... A44C 27/00
  29/896.32
5,338,915 A * 8/1994 Hildebrand ............ B23K 26/04
  219/121.69

(Continued)

FOREIGN PATENT DOCUMENTS

| DE | 2945188 A | 5/1981 |
|---|---|---|
| FR | 2 288 795 A1 | 5/1976 |

(Continued)

OTHER PUBLICATIONS

Vorobyev et al., "Colorizing metals with femtosecond laser pulses", Applied Physics Letters, vol. 92, No. 4, pp. 41914-41914, Jan. 31, 2008, 3 pages; cited in the ESR (in English).

(Continued)

*Primary Examiner* — Daniel P Wicklund
(74) *Attorney, Agent, or Firm* — Seckel IP, PLLC

(57) ABSTRACT

A process for decorating a timepiece component, which includes performing (i) engraving (E10) of a surface to be decorated of the timepiece component with a femtosecond laser; and (ii) structuring (E20) of said surface to be decorated of the timepiece component, these two decorations being at least partially superposed on each other.

26 Claims, 4 Drawing Sheets

Figure 1:
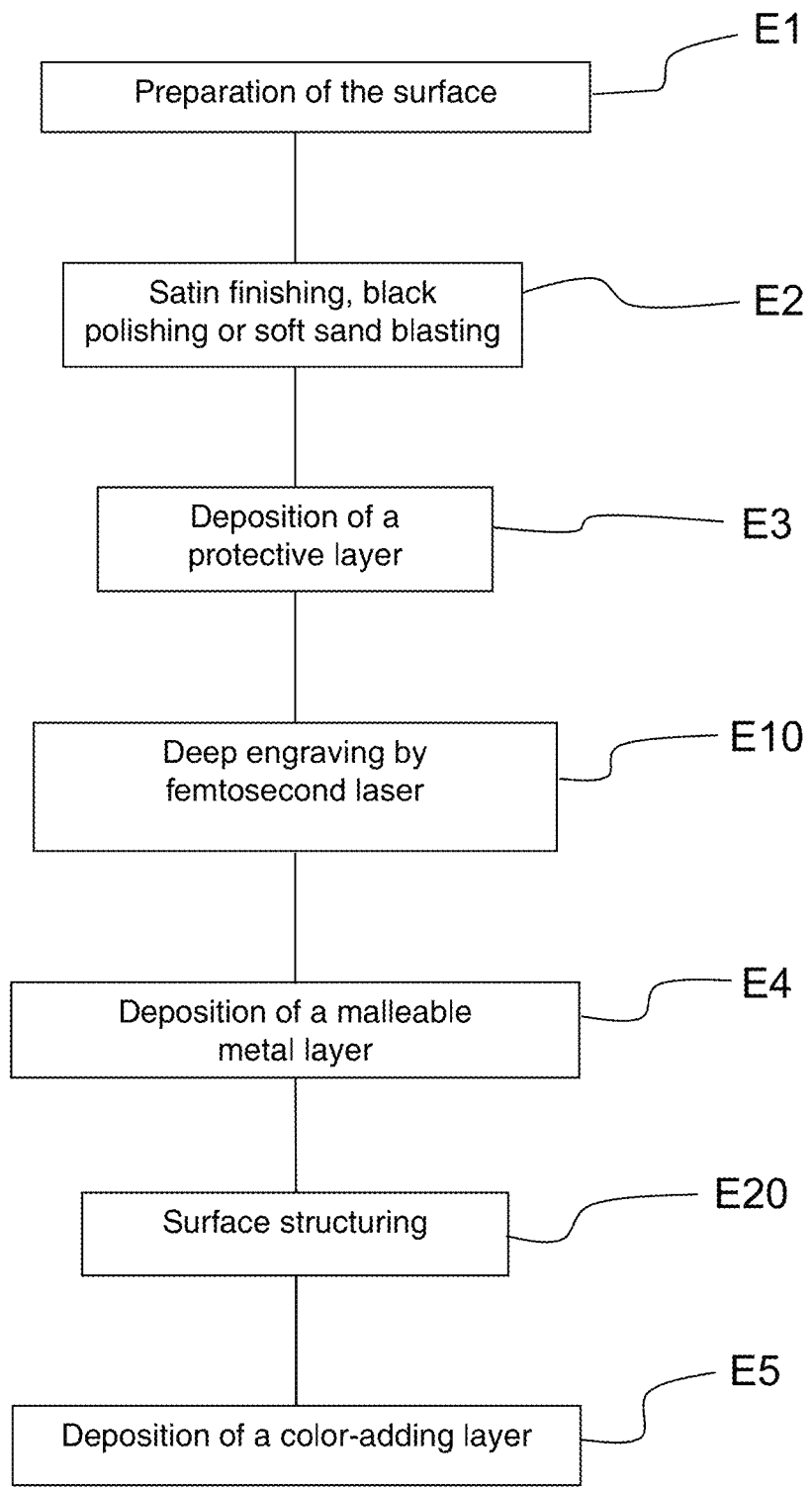

(51) Int. Cl.

| | |
|---|---|
| B23K 26/0622 | (2014.01) |
| B23K 103/04 | (2006.01) |
| B23K 103/00 | (2006.01) |
| B23K 103/14 | (2006.01) |
| B23K 103/12 | (2006.01) |
| B23K 103/08 | (2006.01) |

(56) References Cited

U.S. PATENT DOCUMENTS

| | | | |
|---|---|---|---|
| D723,962 S | 3/2015 | Gueit | |
| 2007/0076531 A1* | 4/2007 | Schiavolini | G04B 19/18 368/291 |
| 2008/0216926 A1 | 9/2008 | Guo et al. | |
| 2011/0259753 A1* | 10/2011 | Grossenbacher | B44C 1/26 205/162 |
| 2012/0255935 A1* | 10/2012 | Kakui | B23K 26/0869 219/121.6 |
| 2014/0363608 A1* | 12/2014 | Russell-Clarke | B44C 1/005 428/66.7 |
| 2015/0049593 A1 | 2/2015 | Oliveira | |
| 2015/0346686 A1* | 12/2015 | Dubois | G04B 13/00 368/168 |
| 2015/0346693 A1* | 12/2015 | Dubois | G04B 39/002 428/57 |

FOREIGN PATENT DOCUMENTS

| | | |
|---|---|---|
| JP | H05-277764 A | 10/1993 |
| JP | 2007-101271 A | 4/2007 |
| JP | 2009-079941 A | 4/2009 |
| JP | 2011-230506 A | 11/2011 |
| JP | 2012-196711 A | 10/2012 |
| JP | 2014-051041 A | 3/2014 |
| WO | 2008/097374 A2 | 8/2008 |
| WO | DM/077857 | 2/2012 |
| WO | 2013/135703 A1 | 9/2013 |

OTHER PUBLICATIONS

European Search Report and Written Opinion dated Jul. 14, 2015 issued in counterpart European application No. 15158933; w/ English partial translation and partial machine translation (13 pages).
EPO opposition dated Feb. 1, 2019 in counterpart application No. EP15158933.0 (EP3067220); with English machine translation (84 pages) (D1, WO2013135703A1, D2, WO2008097374A2, D3, FR2288795A1, D4, Vorobyev et al, are not listed in this IDS since they were already listed in the filed Mar. 11, 2016).
Berner, "Dictionnaire professional illustré de l'horlogerie" ["Illustrated professional dictionary of horology"], Chambre Suisse de l'Horlogerie Ed., La Chaux-de-Fonds, Switzerland, pp. 6-11, 68-69, 114-115, 190-193, 258-261, 288-289, 412-413, 450-451, 666-669, 800-801 (1988) (in English; D7 cited in the EPO opposition).
"Le Quai de L'Horloge" ["The Clock Platform"], Montres Breguet SA Ed., L'Abbaye, Switzerland, No. 1, pp. 1-116 (2011) (total 118 pages) (D8 cited in the EPO opposition).
"Les microsystémes optiques" ["Optical microsystems"], Photoniques, EDP Sciences Ed., Les Ulis, France, No. 60, pp. 1-60 (2012) (total 64 pages) (D9 cited in the EPO opposition).
"Horlogerie Microtechnique" ["Microtechnical horology"], A à Z emplois SA Ed., Moutier, Switzerland, pp. 1-80 (2015) (total 84 pages) (D10 cited in the EPO opposition).
"Micronora", Micronora Informations, Salon International des Microtechniques Ed., Besançon, France, pp. 1-39 (2012) (total 44 pages) (D11 cited in the EPO opposition).
Ahmmed et al., "Fabrication of Micro/Nano Structures on Metals by Femtosecond Laser Micromachining", Micromachines, No. 5, pp. 1219-1253 (2014) (in English; D12 cited in the EPO opposition).
EPO communication dated Sep. 2, 2019 enclosing opposer brief dated Aug. 27, 2019 in EPO opposition of counterpart application No. EP15158933.0 (EP3067220); with English machine-translation (total 87 pages) (D17, EPO legal decision T2258/10 cited in the EPO opposer brief is not listed in this IDS; D19, Vorobyev 2008 publication cited in the EPO opposer brief is also not listed in this IDS since it was already listed in the filed Mar. 11, 2016).
Samuels, "Metallographic Polishing by Mechanical Methods", ASM Int'l, Materials Park, OH (USA), 4th Ed., 2003, Contents, "About the Author", "Preface", and Chapter 7, "Polishing with Abrasives: Principles", pp. iii-x and 153-155 (total 14 pages) (in English; D18 cited in the EPO opposer brief).
Yao et al., "Selective appearance of several laser-induced periodic surface structure patterns on a metal surface using structural colors produced by femtosecond laser pulses", Applied Surface Science, 258, 2012, pp. 7625-7632 (in English; D20 cited in the EPO opposer brief).
Antonov et al., "Coloration of a Metal Surface under Pulsed Laser Irradiation", Technical Physics, vol. 59, No. 10, 2014, pp. 1503-1505 (in English; D21 cited in the EPO opposer brief).
Leveque, "Traitements et Revêtements de Surface des Métaux" ["Treatments and Surface Coatings of Metals"], L'Usine Nouvelle, Dunod, Paris (France), 2007, pp. 16-23; with English machine-translation (total 21 pages) (D22 cited in the EPO opposer brief).
Berner, "Dictionnaire professional illustré de l'horlogerie" ["Illustrated professional dictionary of horology"], Chambre Suisse de l'Horlogerie Ed., La Chaux-de-Fonds, Switzerland, 1988, pp. 12-13 and 558-559 (total 2 pages) (in English; D7-1 cited in the EPO opposer brief).
Japanese Office Action and Search Report dated Mar. 3, 2020 in counterpart application No. JP 2016-047814; w/ English machine translation (total 28 pages) (D1, WO2013135703, D5, US20080216926, and D8, FR2288795 cited in the search report of the JP Office Action are not listed in this IDS since D1 and D8 were cited in the EP search report of the priority application, D5 corresponds to WO2008097374 cited in the EP search report, and D1, D5 and D8 were already listed in the IDS Mar. 11, 2016).

* cited by examiner

PROCESS FOR DECORATING A TIMEPIECE COMPONENT AND TIMEPIECE COMPONENT OBTAINED BY SUCH A PROCESS

This application claims priority from European patent application No. 15158933.0 filed Mar. 13, 2015, the entire content of which is incorporated herein by reference.

The invention relates to a process for decorating a timepiece component, especially a watch component. It also relates to a timepiece component as such obtained by implementing such a process. Lastly, the invention also relates to a timepiece, especially a watch, for example a wristwatch, comprising such a timepiece component.

When it is desired to produce an adornment on a timepiece component, such as a dial, it is known to work the surface in order to give it a structure, conventionally by processes such as milling, brushing or diamond grinding for example. Such a prior-art approach comprises a single step of machining the surface to be decorated, in order to produce a chosen surface finish. This step may be combined with other steps allowing color to be added, such as lacquering, electroplating or PVD deposition steps.

Existing decorating solutions are unsatisfactory. Specifically, it should be noted that horology applications place high demands on such a decorating process: the aesthetic effect obtained is very important and the grinding and coloring must be free from defects or flash. The demands in respect of robustness are also high, because the components decorated in this way are liable to be exterior elements that will be subject to shocks and sometimes to aggressive environments (seawater, sweat, etc.). Lastly, the choice of decorations producible with these existing solutions is limited to a few well-known long-standing solutions, thereby making it impossible to offer original decorating solutions.

In parallel, there exist solutions that are complementary to these decorating processes, the objective of which is not decorative. Document WO 2013/135703 for example describes the use of a femtosecond laser to color a metal substrate and thus mark this substrate.

The aim of the invention is to provide a process for decorating a timepiece component, especially a dial, that allows a novel aesthetic that is attractive and precise and durable over time to be obtained simply and with a high degree of versatility.

For this purpose, the decorating process comprises the following steps:
  deep engraving of a surface to be decorated of the timepiece component with a femtosecond laser; and
  surface structuring of said surface to be decorated of the timepiece component,
  these two decorations being at least partially superposed on each other.

A decorating process, a timepiece component and a timepiece according to the invention are defined by the claims.

The subject matter, features and advantages of the present invention will be described in detail in the following non-limiting description of one particular embodiment given with reference to the appended figures, in which:

FIG. 1 schematically shows the steps of the decorating process according to one embodiment of the invention.

Figure 2:
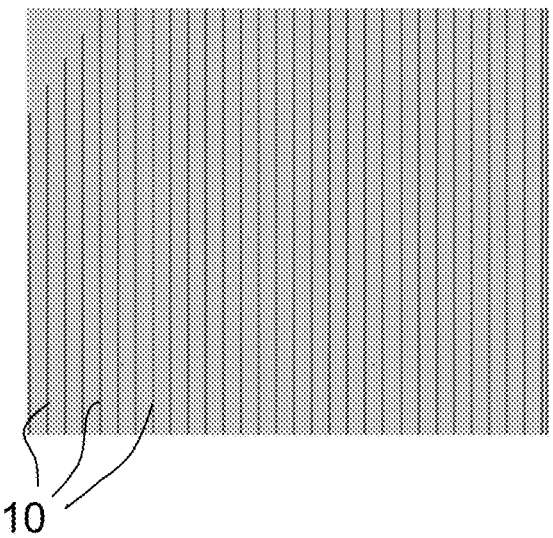

FIG. 2 schematically shows a top view of a timepiece component obtained after a deep-engraving first step according to the embodiment of the invention.

Figure 3:
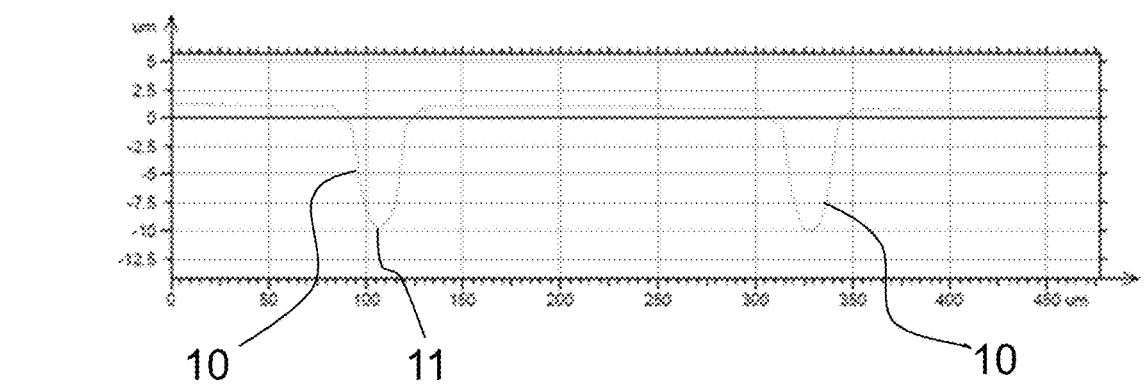

FIG. 3 shows a cross-sectional profile of the timepiece component in a plane transverse to its surface, obtained after the deep-engraving first step according to the embodiment of the invention.

Figure 4:
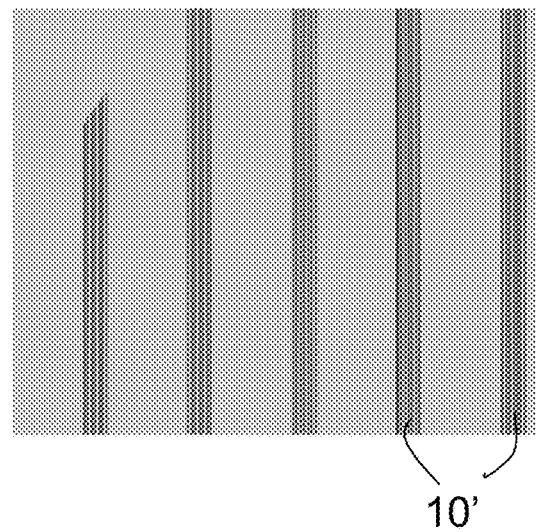

FIG. 4 schematically shows a top view of a timepiece component obtained after a variant of the deep-engraving step according to the embodiment of the invention.

Figure 5:
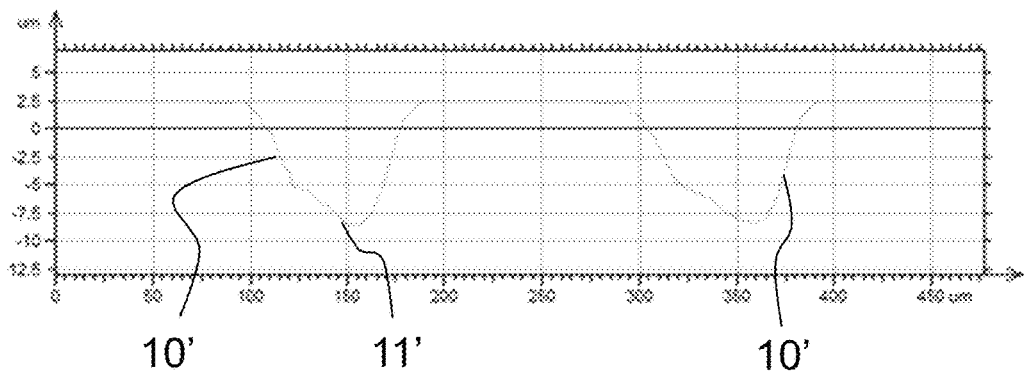

FIG. 5 shows a cross-sectional profile of the timepiece component in a plane transverse to its surface, obtained after the variant of the deep-engraving step according to the embodiment of the invention.

Figure 6:
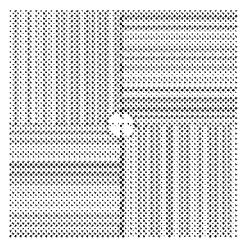

FIG. 6 schematically shows a top view of a portion of a timepiece component obtained after a deep-engraving first step according to the embodiment of the invention.

Figure 7:
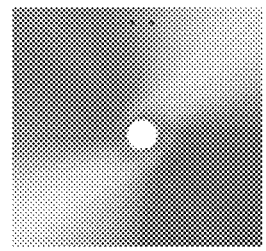

FIG. 7 schematically shows a top view of the same timepiece-component portion, obtained after a deep-engraving first step followed by a surface-structuring second step according to the embodiment of the invention.

Figure 8:
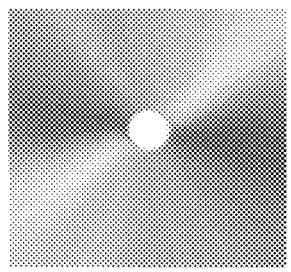

FIG. 8 schematically shows a top view of the same timepiece-component portion obtained after only the surface-structuring second step according to the embodiment of the invention.

Figure 9:
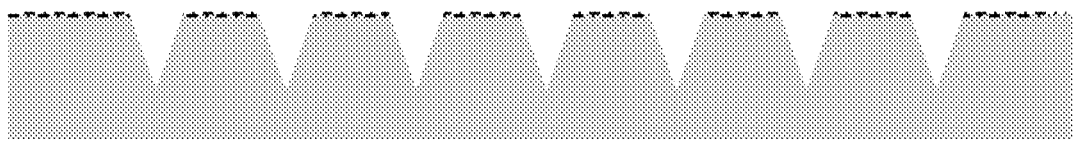

FIG. 9 schematically shows a cross-sectional view of the timepiece-component portion of FIG. 7.

Figure 10:
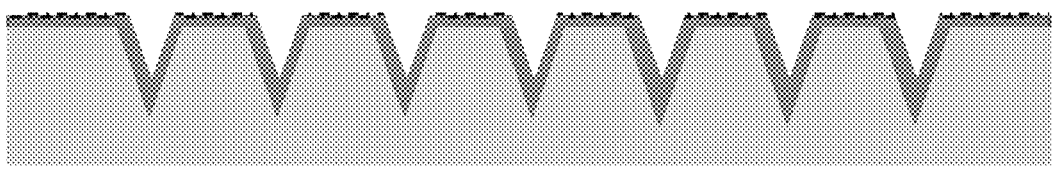

FIG. 10 schematically shows a cross-sectional view of the timepiece-component portion of FIG. 7, in a variant including an intermediate metal layer.

According to the method of implementation of the decorating process of the invention, the possibilities created by femtosecond laser machining are used, in combination with a second decorating technique, to decorate a timepiece component made of a mass of a metal or nonmetal. More precisely, the decorating process comprises deep engraving, carried out using a femtosecond laser, combined with a much more superficial grinding or machining, which will simply be referred to as "surface structuring". The demands and the complexity of these operations are such that it was considered to be unrealistic to combine two machining operations of different nature to form a given decoration on a timepiece component. Specifically, conventional engraving induces burrs that it is necessary to remove by reworking or polishing, which may in turn engender aesthetic defects in the regularity of the engraving. This prejudice is here overcome. It is demonstrated that these combined steps allow a result of unexpected decorative effect to be achieved. This approach in addition has the advantage of greatly increasing the number of ways in which a timepiece component may be decorated.

The embodiment of the invention is thus based on the production of decorations by way of reliefs obtained by recessed portions produced in the surface of a timepiece component, these reliefs being of two different natures and obtained, respectively, by applying two separate and complementary steps of the decorating process.

The invention will now be illustrated nonlimitingly in the context of decoration of a watch dial. It could naturally be used to decorate another timepiece component, of a wristwatch or of a timepiece movement, such as for example and nonlimitingly, a bezel, blank-movements and movement parts, especially barrel drums or covers, or ratchets.

The decorating process according to the embodiment in particular comprises, after steps of preparing the surface E1, of satin finishing, of black polishing or soft sand blasting E2 and of deposition of a protective layer E3 (which steps are conventionally applied in the field of dials and described below), a deep-engraving first step E10 carried out using a femtosecond laser. The laser is used such that it allows a deep engraving to be produced in the surface to be decorated of the dial, how it is set depending on the sought final aesthetics.

A femtosecond laser is a particular type of laser that produces ultra-short pulses the duration of which is about a few femtoseconds to a few hundred femtoseconds (1 fs=1 femtosecond=$10^{-15}$ seconds). Thus, to decorate a dial made of brass, the femtosecond laser may for example generate pulses of 1030 nm wavelength and 20 μJ energy with a pulse rate of 500 kHz and a pulse duration of 270 fs. Naturally, these numerical values are given by way of example and other values comprised in a certain range may be used; the wavelength of the laser may for example be comprised between 300 nm and 1100 nm, for example typically 343 nm for sapphire and 515 nm for silicon. The duration of the pulses may vary between 200 fs and 500 fs.

An optical system is used to form the beam, said system being composed of various components in order to adjust the energy delivered, the polarization of the beam and its size. The beam is scanned over the target (surface of the timepiece component) by an electronically controlled optical device for deviating the beam. It allows the desired patterns to be produced by way of control software. For example, F-theta lenses, of 100 mm and 160 mm focal length are used in the embodiment to allow machining of an area (field) of 72 mm and 121 mm diameter, respectively. With an F-theta lens of 60 mm focal length, the area (field) is decreased to a diameter of 45 mm. The scanning head is controlled by a software package associated with a digital control board allowing the movement of the beam to be synchronized with the firing of the laser. This assembly makes it possible to modify, inter alia, the speed of the movement of the laser beam over the surface to be engraved, the laser scanning strategy and lastly the number of passes over a given zone. The micro-positioning system is controlled along/about five axes, namely three translational axes and two rotational axes.

It will be noted that, contrary to the solution described in document WO 2013/135703, the femtosecond laser is here used to form a decorative engraving, without coloring the bottom of the engraving. The engravings may be any shape, in order to form any design, or indeed letters or numbers.

The depth of the engraving obtained may be adjusted with the number of strokes and therefore the number of repetitions of the scanning pattern: the higher the number of strokes, the deeper the recess will be. In any case, the removal of material resulting from this deep-engraving step E10 causes a recess to form of average depth larger than or equal to 4 μm and preferably comprised between 4 and 25 μm inclusive, or even of an average depth larger than or equal to 8 μm. The expression "deep engraving" is therefore understood to mean an engraving of average depth larger than or equal to 4 μm.

The invention does not relate to the design produced by this engraving step, which makes it possible to produce any curve by moving the beam along a chosen path, and in particular parallel or substantially parallel lines. By way of example, the surface to be decorated may be split into various zones, each zone comprising deep engravings that are parallel to one another, the engravings of two different zones not necessarily being parallel, the engravings of two neighboring zones possibly for example being perpendicular to one another.

FIGS. 2 to 5 for example show engravings obtained by this first deep-engraving step with the following parameters:
diameter of the femtosecond laser beam at the focal point: 20 to 40 μm;
lateral separation between two engravings: 140 to 280 μm; and
engraving depth: 5, 10 or 20 μm.

The lateral and longitudinal degrees of overlap are comprised between 50% and 99%, and are for these exemplary engravings 68% and 84%, respectively. The power densities must be above the ablation threshold of the material, and are typically about $12.7 \times 10^6$ MW/cm$^2$.

FIGS. 2, 3 and 4 and 5, respectively show two exemplary profiles obtained with two different types of scan. Specifically, FIGS. 2 and 3 show a regular profile that is what is referred to as a "line" profile, in which the engravings 10 obtained are narrow and regular (as in particular is the shape of the bottom 11 of the engravings) and of depth substantially equal to 10 μm.

FIGS. 4 and 5 show a less regular profile that is what is referred to as a "fill" profile, obtained by forming a given engraving with a plurality of passes of the laser beam, said passes being shifted laterally, allowing engravings 10' in the form of wider trenches, possibly having an engraving bottom 11' with a less regular profile, to be formed.

The decorating process may comprise a step E4 of depositing a malleable metal layer (described below). It then comprises another surface treatment step that is referred to as a surface-structuring step E20, the structure produced by said structuring being at least partially superposed on the engravings formed in the engraving step.

This surface-structuring step comprises a second machining operation, which may for example be sunray brushing, which consists in producing shallow scratches in the surface of the dial with a brush and/or an abrasive paste. As a variant, this step may comprise soft sand blasting and/or sand blasting and/or fine stamping. In the case of sunray brushing, a fine network of randomly placed streaks will be produced, for example in a silver layer, as will be mentioned below. The streaks produced are very fine and have a depth that is clearly smaller than that of the trenches produced with the laser. The high quality of the engravings produced with the femtosecond laser in the first step allows a second machining operation to be carried out and the required high aesthetic quality (no defects and no flash) to be obtained.

Of course it is possible to imagine using a technique other than the aforementioned sunray-brushing, soft sand blasting, sand-blasting and fine-stamping techniques in this surface-structuring step, depending on the final appearance that it is desired for the dial to have. By way of example, here are other possible techniques that may be implemented in this surface treatment:
satin finishing and brushing, which like soft sand blasting give a very fine and shallow texture;
circular graining, consisting in producing fine concentric circles that bring a surface to life; and
diamond grinding, creating a very smooth polish.

Finally, the surface structuring produces a shallow adornment by controllably but potentially randomly scratching the surface of the part.

The tools used may for example be abrasive-covered buffers or brushes. This surface-structuring step creates a surface roughness preferably comprised between 0.05 and 0.1 μm, and therefore with striations of depth smaller than or equal to 0.1 μm, or even, as a variant, smaller than or equal to 0.3 μm or smaller than or equal to 1 μm. This structuring therefore forms streaks (or striations), over the mentioned thickness, that are preferably dense enough to be visible, and regular and organized, forming a particular weft texture that combines a regular orientation with a detail that varies from one component to another, creating an attractive visual effect.

The surface structuring for example allows known designs to be formed, including:

Côtes de Geneve, which form a pattern of bands of brushed zones. It is possible to vary the width, the fineness, the angle and the relative separation between the bands of cotes. With a reciprocating movement, the abrasive or brush marks the surface with straight or circular parallel striations that form the cotes;

Spotting, which is an adornment made up of concentric circles that are very closely spaced or that even overlap one another. Spotting is commonly used to finish bridges, bottom plates, the bottoms of main-plate recesses and dials;

Sunray brushing, mentioned above, which is a decoration formed of lines having the same point of intersection, which gives the part a sun-like appearance. The radiating lines of this finish are produced by means, for example, of a milling cutter that rotates in the opposite direction to the part and is oriented so as to obtain straight lines passing through a given center point; and Snailing, which is a spiral adornment, generally applied to barrel ratchets, rotors, barrels or even barrel covers. This decoration is obtained by means of a milling cutter that is rotated on the surface of the part while orientating it so as to obtain spiral marks.

As was seen above, the advantage of the process is that it allows two types of adornments, especially deep engraving and sunray brushing, to be combined simply while achieving a high aesthetic quality. Such a combination is not obvious for a dial: the process steps are many and often influence the final rendering obtained. Thus, for example, reworking or polishing, which may be used and required in general to remove engraving burrs, are not possible here because they would degrade the surface finish between the engravings and modify the appearance of the subsequently obtained sunray brushing. Using the femtosecond laser to engrave a dial plate thus greatly simplifies the manufacturing steps, and guarantees a very good aesthetic quality. The laser also makes it possible to finely adjust the parameters of the engraving (line thickness, line depth, distance between lines) in order to obtain the sought aesthetic effect. It allows, inter alia, dials with adornments made up of lines that are oriented differently in different zones of the dial to be produced with a much greater degree of versatility than was possible before.

The two combined types of adornment are at least partially superposed. According to one embodiment, striations obtained in the surface-structuring step cross engravings obtained in the engraving step. The visual effect obtained by this superposition is particular in that it results from a combination of separate effects culminating in a third effect that is a combination of the two adornments taken alone, because the striations obtained by surface structuring modify visibly only the initial surface of the part, which was left intact following the production of the engraving, and do not affect the bottom of the engraved scratches.

The invention also relates to the timepiece component obtained by this decorating process. Such a component thus comprises relief adornments of at least two types, comprising on the one hand deep engravings, and on the other hand a surface structure creating a roughness and/or comprising shallow striations.

FIGS. 6 and 7 illustrate one particular embodiment consisting in first producing regular lines engraved with a femtosecond laser and distributed in each quadrant of a component with an orientation perpendicular to the lines of the two neighboring quadrants (FIG. 6), a sunray finish being superposed on the initial engraving (FIG. 7).

FIG. 8 schematically shows a top view of a timepiece component obtained after implementing only the surface-structuring second step (without the deep-engraving first step). Thus, FIG. 7 shows the timepiece component obtained after implementing the decorating process according to the embodiment, and FIGS. 6 and 8 show the same timepiece component obtained after implementing only the first and second step of the process for decorating the timepiece component according to the embodiment of the invention, respectively. FIG. 7 shows that a novel decoration, that visually is more than a simple addition of the decorations in FIGS. 6 and 8, results from the embodiment of the invention. This surprising effect is even more striking on an actual timepiece component.

The decorating process may comprise optional complementary steps. The complete process, including the optional steps, is illustrated by FIG. 1.

According to the embodiment, the decorating process comprises an initial step E1 of preparing the surface of the dial to be treated. To do this, the plate that forms the dial, which for example is made of a metal such as brass, is polished, washed and degreased. As a variant, the dial, or any other timepiece component to be decorated, may be made of another metal, the term metal including a pure metal or any metal alloy, such as steel, titanium, gold or platinum. Alternatively, it is also possible to imagine a start plate made of a ceramic, for example of zirconia or alumina, of silicon, of glass, of sapphire, of mother-of-pearl or of a mineral material, the face of which shows the natural color of the material or is colored a given color, white for example.

Optionally, the decorating process comprises a complementary treatment step E2 of satin finishing, brushing or soft sand blasting. This step E2 may be carried out at any moment of the decorating process before the surface-structuring step E20.

Likewise, optionally, the decorating process comprises a step E3 of depositing an optional layer, preferably of thickness comprised between 0.2 and 1 µm inclusive, in order to protect the dial from oxidation and/or to give it a color.

After the deep-engraving step E10, a washing operation is carried out, and the decorating process may comprise, according to the embodiment, a step E4 of depositing a metal layer. Preferably, this deposited metal comprises silver, which is sufficiently malleable to be structured during the following operations, especially the surface-structuring step E20. Of course a layer of a malleable metal other than silver may be deposited to facilitate the second machining operation.

A color-adding layer or series of layers may then optionally be deposited in a final step E5 at the end of the decorating process, for example by way of one or more electroplated layers and/or one or more layers formed by PVD (physical vapor deposition), and/or one or more layers formed by ALD (atomic layer deposition) or by any other deposition technique allowing a coating liable to modify the perceived color of the dial to be formed. It is envisionable to deposit the colored layer on only one portion of the dial by masking techniques, or to deposit a plurality of layers of different colors in different locations on the surface of the dial.

The engraving depth, and the lateral distance between two engravings, will be chosen depending on desired aesthetic criteria (for example: optical effect, deposition or not of a transfer, etc.). It is also necessary to allow for the layers that will possibly be deposited after the laser engraving, especially the decorative layer (sunray finish) and the optional color-adding layers. Regarding the latter, the influence of electroplated layers on the aesthetics of the laser adornment is greater than for PVD layers. Specifically, the thickness of the layers, and the process in itself, cause the adornment to be smoothed by about 1 µm.

The decorating process was illustrated above by way of example, and it is envisionable to invert the order of certain steps, such as to produce the surface structuring, especially the sunray brushing, after a step of depositing a colored layer, for example, or before the laser engraving, for example.

In general, a lacquer is then deposited, then a transfer with markings (letters, numbers, markers, railroads, other signs) is applied to the dial. Optionally, the finished dial may also include applied chapters, such as luminescent markers or the crimped settings for precious stones.

The invention claimed is:

1. A timepiece component comprising:
   at least one deep engraving obtained with a femtosecond laser, and
   a surface structure,
   wherein at least one portion of the surface structure is superposed on the at least one deep engraving obtained with the femtosecond laser to form at least one area of superposition,
   wherein a visual effect in any location of the at least one area of superposition is visually different:
      from a visual effect that is obtained in the same location with the same at least one deep engraving without the at least one area of superposition, and
      from a visual effect that is obtained in the same location with the same surface structure without the at least one area of superposition.

2. The timepiece component according to claim 1, wherein the deep engraving has an average depth larger than or equal to 4 µm, and wherein the surface structure comprises recesses of depth smaller than or equal to 0.1 µm.

3. The timepiece component according to claim 1, wherein the timepiece component is a dial or a bezel or a blank-movement, or a movement part.

4. The timepiece component according to claim 1, wherein the timepiece component is made of metal, or of a ceramic, or of silicon, or of glass, or of sapphire, or of mother-of-pearl or of a mineral material.

5. A timepiece, comprising the timepiece component according to claim 1.

6. The timepiece component according to claim 1, wherein the deep engraving has an average depth larger than or equal to 8 µm.

7. The timepiece component according to claim 1, wherein the surface structure comprises recesses of depth smaller than or equal to 0.3 µm.

8. The timepiece component according to claim 1, wherein the surface structure comprises a structure obtained by sunray brushing, or satin finishing, or soft sand blasting, or sand blasting, or fine stamping, or circular graining, or spotting, or snailing, or producing Côtes de Genève.

9. The timepiece component according to claim 1, comprising an intermediate metal layer.

10. The timepiece component according to claim 9, wherein the intermediate metal layer is a layer of a malleable metal.

11. The timepiece component according to claim 1, wherein the deep engraving includes at least one selected from the group consisting of:
    lines that are parallel or substantially parallel; and
    lines that are parallel or substantially parallel in various zones of the surface to be decorated, these lines not being parallel between two different zones.

12. The timepiece component according to claim 1, wherein the at least one deep engraving includes engravings, and the surface structure includes striations that cross the engravings.

13. The timepiece component according to claim 1, wherein the at least one deep engraving includes engravings of depth between 4 and 25 µm.

14. A process for decorating a timepiece component, comprising:
    deep engraving a surface to be decorated of the timepiece component with a femtosecond laser; and
    surface structuring said surface to be decorated of the timepiece component,
    these two decorations being at least partially superposed on each other,
    so as to obtain the timepiece component according to claim 1.

15. The process for decorating the timepiece component according to claim 14, wherein the deep-engraving produces engravings of depth larger than or equal to 4 µm.

16. The process for decorating the timepiece component according to claim 14, wherein the surface-structuring comprises sunray brushing, or satin finishing, or soft sand blasting, or sand blasting, or fine stamping, or circular graining, or spotting, or snailing, or producing Côtes de Genève.

17. The process for decorating the timepiece component according to claim 14, wherein the surface-structuring produces reliefs of average depth smaller than or equal to 0.1 µm.

18. The process for decorating the timepiece component according to claim 14, comprising an intermediate depositing of a metal layer.

19. The process for decorating the timepiece component according to claim 18, wherein the metal layer deposited is a layer of a malleable metal.

20. The process for decorating the timepiece component according to claim 14, comprising coloring by at least one of (i) depositing at least one of one or more electroplated layers, one or more PVD layers, and one or more ALD layers, and (ii) deposition by any other technique allowing a coating liable to modify the perceived color of the timepiece component to be formed.

21. The process for decorating the timepiece component according to claim 14, wherein the deep-engraving produces at least one of:
    lines that are parallel or substantially parallel; and
    lines that are parallel or substantially parallel in various zones of the surface to be decorated, these lines not being parallel between two different zones.

22. The process for decorating the timepiece component according to claim 14, wherein the surface-structuring forms striations that cross engravings formed by the deep-engraving.

23. The process for decorating the timepiece component according to claim 14, wherein the deep-engraving produces engravings of depth larger than or equal to 8 µm.

24. The process for decorating the timepiece component according to claim 14, wherein the deep-engraving produces engravings of depth between 4 and 25 µm.

25. The process for decorating the timepiece component according to claim 14, wherein the surface-structuring produces reliefs of average depth smaller than or equal to 0.3 µm.

26. The process for decorating the timepiece component according to claim 14, wherein the surface-structuring produces reliefs of average depth smaller than or equal to 1 µm.

* * * * *